(12) United States Patent
Kasevich et al.

(10) Patent No.: US 12,276,503 B2
(45) Date of Patent: Apr. 15, 2025

(54) PHASE-SPACE FILTERING IN THERMAL BEAM INERTIAL SENSORS

(71) Applicant: AOSense, Inc., Sunnyvale, CA (US)

(72) Inventors: Mark A. Kasevich, Palo Alto, CA (US); Igor Teper, Half Moon Bay, CA (US)

(73) Assignee: AOSense, Inc., Fremont, CA (US)

( * ) Notice: Subject to any disclaimer, the term of this patent is extended or adjusted under 35 U.S.C. 154(b) by 388 days.

(21) Appl. No.: 17/487,539

(22) Filed: Sep. 28, 2021

(65) Prior Publication Data
US 2023/0392928 A1    Dec. 7, 2023

(51) Int. Cl.
*G01C 19/64* (2006.01)
*G01C 19/58* (2006.01)
*G21K 1/00* (2006.01)

(52) U.S. Cl.
CPC .............. *G01C 19/64* (2013.01); *G01C 19/58* (2013.01); *G21K 1/00* (2013.01)

(58) Field of Classification Search
CPC .. G01B 9/02; G01B 9/02001; G01B 9/02015; G01B 9/02017; G01C 19/58; G01C 19/62; G01V 7/04
See application file for complete search history.

(56) References Cited

U.S. PATENT DOCUMENTS

| | | |
|---|---|---|
| 5,315,109 A | 5/1994 | Thomas |
| 9,019,506 B1 | 4/2015 | Black |
| 9,046,368 B2 | 6/2015 | Bidel |
| 9,291,508 B1 * | 3/2016 | Biedermann .......... G01C 19/58 |
| 9,772,175 B2 | 9/2017 | Black |
| 10,288,428 B1 * | 5/2019 | Cingoz ................. G01P 15/093 |
| 11,852,485 B2 * | 12/2023 | Kasevich ............... G01C 19/58 |

(Continued)

FOREIGN PATENT DOCUMENTS

| | | |
|---|---|---|
| CN | 102538775 | 7/2012 |
| FR | 2848296 | 2/2005 |
| WO | 2019157217 | 8/2019 |

OTHER PUBLICATIONS

Gustavson et al.: "Precision Rotation Measurements with an Atom Interferometer Gyroscope", Physical Review Letters, vol. 78, No. 11, Mar. 1, 1997 (Mar. 1, 1997), pp. 2046-2049, XP055254680, US ISSN: 0031-9007, DOI: 10.1103/PhysRevLett.78.2046.

*Primary Examiner* — Violeta A Prieto
(74) *Attorney, Agent, or Firm* — Van Pelt, Yi & James LLP

(57) ABSTRACT

A device comprises thermal atomic source(s), atom interference lasers, and additional laser beam(s). The thermal atomic source(s) provide atomic beam(s). The atom interference lasers are disposed to provide interrogation laser beams that interrogate the atomic beam(s) to assist in generating atom interference. The interrogation laser beams are configured so as to enable a first speed selectivity and/or angle selectivity of a set of atoms used in the atom interference by restricting the set of atoms. The additional laser beam(s) are configured in such a way that, combined with the speed and/or the angle selectivity of the atom interference lasers, achieve a second speed selectivity and/or angle selectivity of the set of atoms that contribute to a final detected interference signal by restricting the set of atoms to a second speed-angle phase space, where the first speed-angle phase space and the second speed-angle phase space intersect to enhance signal stability.

21 Claims, 6 Drawing Sheets

(56) References Cited

U.S. PATENT DOCUMENTS

| | | | |
|---|---|---|---|
| 11,867,852 B1* | 1/2024 | Cashen | G01C 19/58 |
| 11,965,780 B2* | 4/2024 | Bowman | G02B 21/16 |
| 2016/0216114 A1* | 7/2016 | Kotru | G01C 19/58 |
| 2016/0298967 A1 | 10/2016 | Johnson | |
| 2019/0376790 A1 | 12/2019 | Barrett | |
| 2020/0161446 A1 | 5/2020 | Anderson | |
| 2022/0163331 A1* | 5/2022 | Kasevich | G01V 7/04 |

* cited by examiner

PHASE-SPACE FILTERING IN THERMAL BEAM INERTIAL SENSORS

The invention was made with Government support. The Government has certain rights in the invention.

BACKGROUND OF THE INVENTION

Atom interferometers exploit the wave-like properties of atoms to sensitively measure small differences between different atomic spatial trajectories. Generally, this is done by measuring interference effects that result when a beam of atoms is manipulated such that the atomic wave packets are split into two or more components and subsequently recombined. The wave-like properties of matter allow interference measurements to be exploited at a scale orders of magnitude smaller than for light because the typical de Broglie wavelengths associated with massive particles are very small compared to wavelengths associated with massless photons of visible light. Examples of these precision measurements include high precision inertial sensing, gravity gradiometry, and measurements of fundamental physical constants and quantum phenomena. Typically, these precision measurements take place in static environments such as in a research laboratory, and there are significant challenges of using atomic interferometers in a dynamic environment, such as in a spacecraft or airplane, where vibrations and accelerations can be large. Moreover, bias drifts in the sensor, even in the absence of inertial inputs (accelerations and rotations) are dependent on atom velocity. Over time, the temperature of the thermal atomic beam may drift, due to imperfect oven/ nozzle temperature control, changes in environmental temperature, and long thermal time constants within the sensor head. As the temperature drifts, the mean atom velocity will also drift, producing drifts in sensor scale factors. Other significant sources of sensor bias include changes in oven pointing that are actuated by thermal drifts. These changes result in drifts in the direction of the atomic beam, and thus in the relationship between the mean atom velocity along the Raman interrogation beams and perpendicular to the Raman interrogation beams and lead to the same kind of drifts in scale factor and bias as changes in atom velocity. In addition, the distribution of longitudinal velocities (perpendicular to the Raman beams) associated with the angle spread of the atomic source may lead to a loss of interferometer contrast at suitably large acceleration or rotation inputs.

BRIEF DESCRIPTION OF THE DRAWINGS

Various embodiments of the invention are disclosed in the following detailed description and the accompanying drawings.

DETAILED DESCRIPTION

Figure 1:
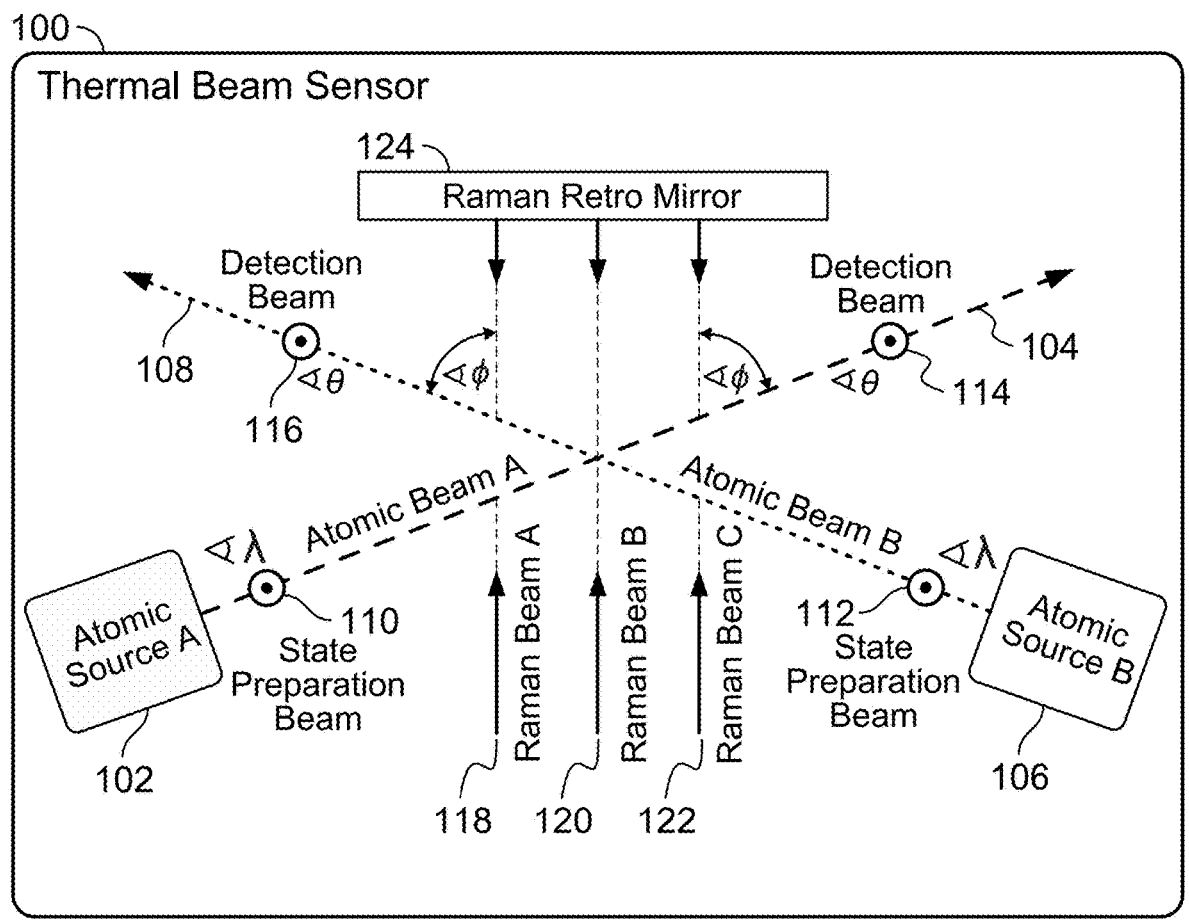
FIG. 1 is a block diagram illustrating an embodiment of a thermal beam inertial sensor utilizing phase-space filtering.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An atom interferometer device for inertial sensing is disclosed. The atom interferometer device for inertial sensing comprises one or more thermal atomic sources, a state preparation laser, a set of atom interference lasers, and a detection laser. The one or more thermal atomic sources provide one or more atomic beams. A set of atom interference lasers is disposed to provide interrogation laser beams that interrogate the one or more atomic beams to assist in generating atom interference, where the interrogation laser beams are configured so as to enable a first speed selectivity and/or a first angle selectivity of a set of atoms used in the generating of the atom interference by restricting the set of atoms that are involved in the atom interference to a first speed-angle phase space associated with the set of atoms. One or more additional sets of laser beams are configured in such a way that, combined with the speed and/or the angle selectivity of the set of atom interference lasers, achieve a second speed selectivity and/or a second angle selectivity of the set of atoms that contribute to a final detected interference signal by restricting the set of atoms that are involved in the atom interference to a second speed-angle phase space associated with the set of atoms, wherein the first speed-angle phase space and the second speed-angle phase space intersect to enhance signal stability.

In various embodiments, an additional laser beam of the one or more additional sets of laser beams used to achieve the second speed selectivity and the second angle selectivity comprises a detection laser beam, a state preparation laser beam, or any other appropriate laser beam.

In some embodiments, a second additional laser beam of the one or more additional sets of laser beams is used to achieve a third speed selectivity and a third angle selectivity of the set of atoms that contribute to a final detected interference signal by restricting the set of atoms that are involved in the atom interference to a third speed-angle phase space associated with the set of atoms, where the third speed-angle phase space, the first speed-angle phase space, and the second speed-angle phase space intersect to enhance signal stability. In some embodiments, the additional laser beam of the one or more additional sets of laser beams used to achieve the second speed selectivity and the second angle selectivity comprises a detection laser beam and the third speed selectivity and the third angle selectivity comprises a state preparation laser beam used to prepare atoms in a desired initial state.

In some embodiments, the angle of the state preparation beam to the one or more atomic beams for the second angle selectivity is selected to optimize for number of atoms in an initial state. In some embodiments, the angle of the state preparation beam is approximately a right angle.

In some embodiments, a laser beam of the set of atom interference lasers or of the one or more additional sets of laser beams achieves the first speed selectivity, the second speed selectivity, the first angle selectivity, and/or the second angle selectivity via a combination of angle with respect to the atomic beam and frequency detuning with respect to the atomic transition of the laser beam. In some embodiments, the first speed selectivity or the second speed selectivity produced by the laser beam comprises transverse velocity selectivity. In some embodiments, first speed selectivity or the second speed selectivity produced by the laser beam comprises longitudinal velocity selectivity.

In some embodiments, the longitudinal velocity selectivity is achieved using a time-of-flight selection by pulsing of a state preparation laser beam, a laser beam of the set of atom interference lasers, and/or a detection laser.

For the atom interferometer device, each atomic beam is acted on as follows: 1) the atoms in the atomic beam are put into a specific state using the state preparation laser; 2) the atoms are processed using three Raman interrogation beams for atomic interferometry; and 3) the atoms' state are detected using a detection beam.

In some embodiments, the state preparation comprises a cooling stage, where the cooling stage cools one of the one or more atomic beams using laser cooling. In some embodiments, the laser cooling is transverse to a beam direction of one of the one or more atomic beams. In some embodiments, the laser cooling is longitudinal to a beam direction of one of the one or more atomic beams.

In a thermal beam inertial sensor, the atoms being interrogated come out of an oven nozzle with a range of trajectories and speeds. For example, the atom source can be produced by heating a source of appropriate atoms to form a vapor. The vapor is then collimated by a nozzle or array of collimating holes. In some embodiments, one of the one or more atomic beams is collimated using an aperture.

The atomic interferometer is comprised of counter-propagating atomic trajectories and outputs a pair of photodetector signals containing information about the atomic states of the atoms in the interferometer. For example, three or more interferometer laser interactions such as two-photon stimulated Raman transitions are applied to the atoms, and the number of atoms in a particular atomic state after atoms exit the interferometer depends on the rotation or acceleration of the optical platform relative to the inertial trajectory of atoms in vacuum. The number of atoms in a particular state can be measured by a photodetector that detects fluorescence scattered by atoms resonant with one or more detection laser beams.

In some embodiments, a processor is configured to determine an inertial measurement based at least in part on the atom interference detected using the detection laser. For example, a hyperfine energy level distribution sensor converts the pair of photodetector signals from the atomic interferometer into a pair of values that are proportional to the number of atoms in the hyperfine energy state (e.g., hyperfine energy state of alkali atoms such as cesium, rubidium, etc.) and outputs them to a phase pair calculator. A phase pair calculator inputs values from the hyperfine energy level distribution sensor and outputs a pair of atomic phases which are used to calculate linear acceleration and rotation. In some embodiments, the sensitivity axes of the sensor are given by (1) the direction of the Raman (interferometer) beams for the case of linear acceleration and (2) the direction of the cross-product of the atomic velocity and the Raman beam directions for rotation.

Because the output phase of an atom interferometer under accelerations and rotations is velocity dependent, the observation that the atoms emerge from oven nozzle with a range of trajectories and speeds poses a problem for the sensor stability. For example. the phase shift due to acceleration a and rotation Ω are given by:

$$\phi = k \cdot aT^2 = k \cdot a(L/v)^2,$$

$$\phi = 2k \cdot v \times \Omega T^2 = 2k \cdot v \times \Omega(L/v)^2,$$

where k=4π/λ is the effective Raman two photon wavevector, v is the atom velocity and L is the distance between the three Raman interrogation laser beams that create the atom interferometer. The output of the atom interferometer is given by the sine of the phase of the interferometer which includes all inertial and other phase shifts.

Additionally, many bias drifts in the sensor, even in the absence of inertial inputs (accelerations and rotations) are also dependent on atom velocity. Over time, the temperature of the thermal atomic beam may drift, due to imperfect oven/nozzle temperature control, changes in environmental temperature, and long thermal time constants within the sensor head. As the temperature drifts, the mean atom velocity will also drift, producing first-order-sensitive drifts in sensor scale factor as well as other significant sources of sensor bias.

One important example of a velocity-sensitive bias is the "clearing phase." The interferometer phase is read out as the phase of a modulation imprinted onto the atomic fluorescence signal, and the phase is measured by mixing the atomic fluorescence signal with a reference RF signal in the controller. However, where the phase of the atomic signal is fixed when the atoms interact with the third Raman pulse, the phase of the microwave signal continues to evolve while the atoms travel from the third microwave pulse to the detection region, creating a phase shift between the two signals that is proportional to the atom travel time (inversely proportional to the atom velocity). As long as the atom velocity is fixed, this is just a constant overall phase offset that doesn't affect the sensor's performance, but if the atom velocity changes, this phase shift changes, which mimics an applied rotation, causing bias drifts that are first-order sensitive in the mean velocity if the atoms that contribute to the interferometer signal.

Furthermore, changes in oven pointing, actuated by thermal drifts, will cause drifts in the direction of the atomic beam, and thus in the relationship between the mean atom velocity along the Raman interrogation beams and perpendicular to the Raman interrogation beams, which will lead to the same kind of drifts in scale factor and bias as changes in atom velocity. Finally, the distribution of longitudinal velocities (perpendicular to the Raman beams) associated with the angle spread of the atomic source leads to a loss of interferometer contrast at suitably large acceleration or rotation inputs.

FIG. 1 is a block diagram illustrating an embodiment of a thermal beam inertial sensor utilizing phase-space filtering. In the example shown, the velocity-selective atomic state preparation and detection scheme provides device stability against drifts when atoms emerge from thermal atomic source 102 and atomic source 106 with a range of trajectories and speeds. FIG. 1 shows thermal beam sensor 100 with retro mirror 124 in which thermal beam 104 and thermal beam 108 are slightly tilted by an angle ⊲ φ with respect to Raman beam A 118, Raman beam B 120, and Raman beam C 122, are at an angle ⊲ λ with respect to state preparation beam 110 and state preparation beam 112, and are at an angle ⊲ θ with respect to detection beam 114 and detection beam 116. These angles result in a Doppler shift that can be used to separate (in terms of their laser frequency) Doppler-sensitive and Doppler-free two-photon Raman transitions, as well as the two possible k-directions of Doppler-sensitive two-photon Raman transitions, which are ultimately useful in preventing drifts from affecting the sensor's output measurements. In some embodiments, the angle of an interrogation laser beam of the Raman interrogation laser beams to the one or more atomic beams is selected to break degeneracy using a Doppler shift by tilting by an angle ⊲ φ. In various embodiments, the angle ⊲ φ comprises one of the following: 90 degrees plus 2.5, 2.0, 1.5, 1.0, 0.5, or minus 0.5, 1.0, 1.5, 2.0, or 2.5 degrees, an angle between 87.5 and 92.5 degrees, between 90 degrees plus 2.5, 2.0, 1.5, 1.0, or 0.5 and 90 degrees minus 0.5, 1.0, 1.5, 2.0, or 2.5 degrees, or any other appropriate angle. In some embodiments, the Raman interrogation laser beams are in the plane of the two atomic beams.

Atomic source 102 generates atomic beam 104. Atomic source 106 generates atomic beam 108. In some embodiments, atomic source 102 and atomic source 106 are each thermal beams from an effusive oven. Atomic source 102 and atomic source 106 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form an atomic beam such as atomic beam 104 and/or atomic beam 108. In some embodiments, the one or more atomic beams comprise two atomic beams where the two atomic beams cross at an angle less than or equal to five degrees.

State preparation beam 110 and state preparation beam 112 put atoms from atomic beam 104 and atomic beam 108 into a desired internal quantum state by creating state-prepared atomic beams. For example, in the case of cesium, state preparation beam 110 and state preparation beam 112 simultaneously clear the F=4 ground state and optically pump the F=3 ground state atoms into the $m_F=0$ magnetic sublevel. State preparation beam 110 and state preparation beam 112 may have an angle λ (⊲ λ) relative to atomic beam 104 and atomic beam 108 in order to ensure all atoms with a particular velocity are cleared out of the F=4 ground state used for fluorescence detection. In some embodiments, state preparation beam 110 state preparation beam 112 are orthogonal (e.g., angle λ comprises 90°) to atomic beam 104 and atomic beam 108, respectively, in order to ensure that atoms irrespective of their velocities are cleared out of the F=4 ground state used for fluorescence detection.

The state-prepared atomic beams then enter the atom interferometer (i.e., one state prepared atomic beam (atomic beam 104) enters from the left and one (atomic beam 108) enters from the right), which is created using a sequence of three interferometer interrogation beams (i.e., Raman beam A 118, Raman beam B 120, and Raman beam C 122) that are at an angle ⊲ φ with respect to atomic beam 104 and atomic beam 108. In some embodiments, the Raman interrogation laser beams cross each of the two atomic beams at symmetric angles.

For a given Doppler-sensitive Raman transition, the Raman beams will only be resonant with atoms with a given velocity projection $v_t$ along the Raman beams. This resonance corresponds to a combination of a given atom's forward velocity $v_l$ along its trajectory and the tilt angle φ of the Raman beams with respect to that atom's trajectory: $v_t = v_l \cos φ$. Due to this relationship, for a given Raman beam configuration corresponding to a fixed $v_t$, changes in oven temperature or pointing will have a first-order effect on the mean $v_l$ of atoms participating in the interferometer (i.e., resonant with the Raman transitions), and thus a first-order effect on interferometer scale factor and significant sources of bias, such as the clearing phase.

Raman beam A 118, Raman beam B 120, and Raman beam C 122 comprise the interferometer interrogation beams. For example, interferometer interrogation beams are two-photon stimulated Raman transitions that are tuned to coherently split into a superposition of states and then recombine the atomic wave packets. At the output of the interferometer one can monitor the atomic population in the states that partake in the interferometer—in the case of cesium, in either the F=3 or F=4 atomic states, by using detection beam 114 and detection beam 116 which can be tuned, in the case of cesium, to the F=4 resonance to induce fluorescence proportional to the number of atoms in the F=4 state. The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

Detection beam 114 and detection beam 116 are used to detect fluorescence scattered by atoms resonant with one or more detection laser beams. In some embodiments, detection beam 114 and detection beam 116 are used to detect absorption of atoms resonant with one or more detection laser beams. In some embodiments, an angle θ (⊲ θ) is introduced between the detection beam 114 and atomic beam 104 as well as between detection beam 116 and atomic beam 108 to provide velocity selectivity in the detected atom signal via the Doppler shift associated with the detection beam wave-vector and the atomic velocity. This reduces the spread in atomic velocities which are effectively detected such that contrast is maintained across larger accelerations. For example, the Doppler effect is used by angling the detection beam 114 with respect to the atomic beam 104 after the interferometer sequence Raman beam 118, Raman beam 120, and Raman beam 122 in order to decrease the longitudinal velocity width of atoms contributing to the signal. The detection beams will only be resonant with atoms with a given velocity projection $v_d$ along the detection beam. This resonance corresponds to a combination of a given atom's forward velocity $v_l$ along its trajectory and the tilt angle θ of the detection beams with respect to that atom's trajectory $v_d = v_l \cos θ$. The addition of a tilted detection beam can greatly reduce signal drifts by narrowing the range of velocities that are within the resonance condition. In some embodiments, a pulse time width or a pulse beam width interacting with the one or more atomic beams are selected to determine the second velocity selectivity.

The combination of angled Raman beam and angled detection beam serves to effectively narrow the region in the velocity-angle phase space for atoms that both participate in the interferometer (are resonant with Raman beams) and are detected at the end (are resonant with the detection beam). As a result, the sensitivity of scale factor and bias drifts that would otherwise be first-order to changes in the mean velocity or angle becomes second-order, which, can lead to significant sensor performance improvements.

Figure 2:
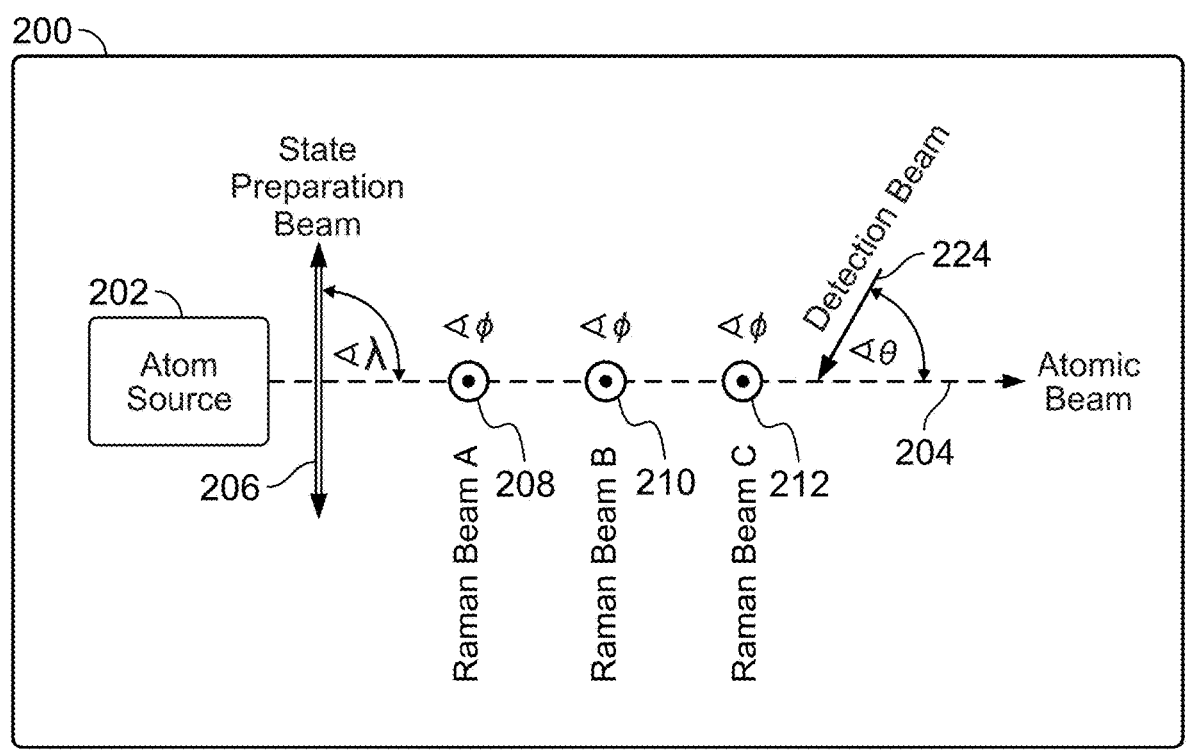
FIG. 2 is a block diagram illustrating an embodiment of an atomic interferometer utilizing velocity-selective state-preparation, interrogation, and detection of an atomic source.

FIG. 2 is a block diagram illustrating an embodiment of an atomic interferometer utilizing velocity-selective state-preparation, interrogation, and detection of an atomic source. In the example shown, the velocity-selective atomic state preparation, interrogation, and detection scheme provides sensor stability under acceleration and rotation when atoms emerge from thermal atomic source 202 with a range of trajectories and speeds.

In some embodiments, thermal beam sensor 200 of FIG. 2 shows a side view of thermal beam sensor 100 of FIG. 1 for one of the two counter-propagating atomic beams in the device. This design can be applied to any number of atomic beams simultaneously but is shown here applied to just one beam for clarity. Atomic source 202 generates atomic beam 204. In some embodiments, atomic source 202 is a thermal beam from an effusive oven. Atomic source 202 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form atomic beam 204.

State preparation beam 206 makes an angle ⊲ λ with respect to atomic beam 204 and puts atoms in atomic beam 204 into a desired quantum state. For example, in the case of cesium, state preparation beam 206 simultaneously clears the F=4 ground state and optically pumps the F=3 ground state atoms into the $m_F$=0 magnetic sublevel. State preparation beam 206 uses the Doppler effect by making an angle ⊲ λ to atomic beam 204 in order to ensure all atoms with a particular velocity are cleared out of the F=4 ground state used for fluorescence detection. In some embodiments, state preparation beam 206 is kept orthogonal to atomic beam 204 in order to ensure all atoms irrespective of their velocities are cleared out of the F=4 ground state used for fluorescence detection.

The state-prepared atomic beam then enters the atom interferometer which is created using a sequence of three interferometer interrogation beams. Raman beam A 208, Raman beam B 210, and Raman beam C 212 comprise the interferometer interrogation beams and are angled by ⊲ φ with respect to atomic beam 204. For example, interferometer interrogation beams are two-photon stimulated Raman transitions that are tuned to coherently split into a superposition of states and then recombine the atomic wave packets. At the output of the interferometer one can monitor the atomic population, in the case of cesium, in either the F=3 or F=4 atomic states by using a detection beam 224 which can be tuned to the F=4 resonance to induce fluorescence proportional to the number of atoms in the F=4 state. The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

Detection beam 224 is used to detect fluorescence scattered by atoms resonant with one or more detection laser beams. In some embodiments, detection beam 224 is used to detect absorption of atoms resonant with one or more detection laser beams. An angle θ is introduced between the detection beam 224 and atomic beam 204 to provide velocity selectivity in the detected atom signal via the Doppler shift associated with the detection beam wave-vector and the atomic velocity. This reduces the spread in atomic velocities which are effectively detected such that contrast is maintained across larger accelerations and temperature fluctuations. For example, the Doppler effect is used by angling the detection beam 224 with respect to the atomic beam 204 after the interferometer sequence Raman beam A 208, Raman beam B 210, and Raman beam C 212 in order to decrease the longitudinal velocity width of atoms contributing to the signal. The detection beams will only be resonant with atoms with a given velocity projection $v_d$ along the detection beam. This resonance corresponds to a combination of a given atom's forward velocity $v_l$ along its trajectory and the tilt angle θ of the detection beams with respect to that atom's trajectory $v_d = v_l \cos θ$.

Figure 3:
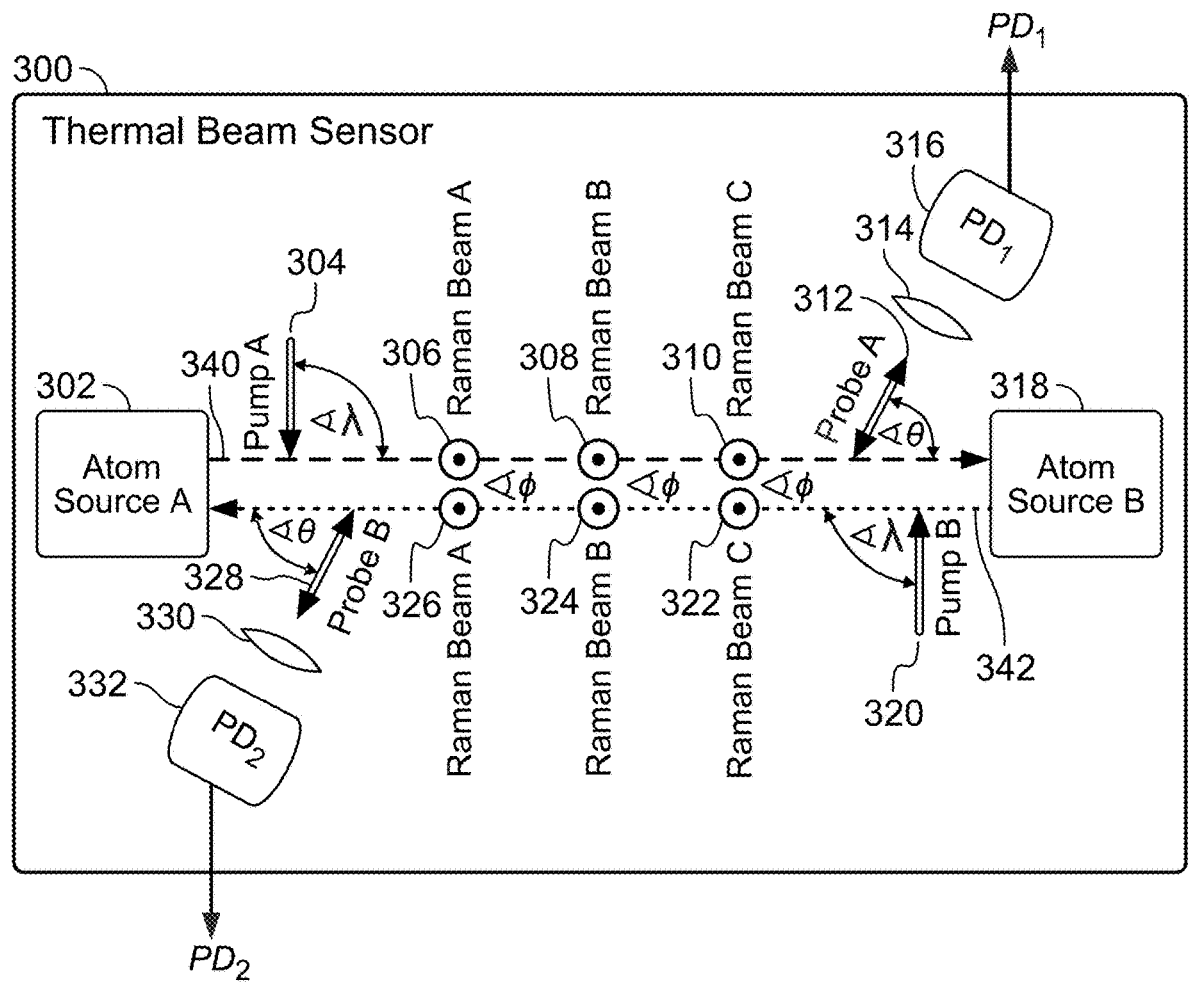
FIG. 3 is a block diagram illustrating an embodiment of an atomic interferometer.

FIG. 3 is a block diagram illustrating an embodiment of an atomic interferometer. In some embodiments, atomic interferometer 200 is used to implement each of the two counter-propagating atomic interferometers of FIG. 3. In the example shown, atom source A 302 and atom source B 318 output atomic beams that traverse along the long axis of the sensor. The beam separation in FIG. 3 is exaggerated (e.g., the beams are approximately spatially overlapping). Atom source A 302 and atom source B 318 are produced by heating a source of appropriate atoms to form a vapor. Any atoms with transitions amenable to atomic physics techniques using available lasers may be used (e.g., alkali atoms such as cesium, rubidium, etc.). The vapor is collimated by a nozzle or array of collimating holes.

In order to optimize the performance of the atom interferometer, for the case of atomic cesium the atoms are optically pumped into the F=3 hyperfine ground state into the $m_F$=0 magnetic sublevel. The optically pumped atomic beam then enters the atom interferometer which is created using a sequence of three interferometer interrogation beams. State preparation beam 304 makes an angle ⊲ λ with respect to atomic beam 340 and puts atoms in atomic beam 340 into a desired quantum state. State preparation beam 320 makes an angle ⊲ λ with respect to atomic beam 342 and puts atoms in atomic beam 342 into a desired quantum state. In some embodiments, the angle ⊲ λ of the state preparation beam to the one or more atomic beams for the angle selectivity is selected to optimize for number of atoms in an initial state. In some embodiments, the angle ⊲ λ is approximately a right angle.

The three sets of Raman beams comprise the interferometer interrogation beams; Raman beam A 208, Raman beam B 210, and Raman beam C 212 comprise the interferometer interrogation beams and are angled by ⊲ φ with respect to atomic beam 340 and atomic beam 342. The first set comprises beam 306 and beam 326 that are angled by ⊲ φ with respect to atomic beam 340 and atomic beam 342. The second set comprises beam 308 and beam 324 that are angled by ⊲ ϕ with respect to atomic beam 340 and atomic beam 342. The third set comprises beam 310 and beam 322 that are angled by ⊲ ϕ with respect to atomic beam 340 and atomic beam 342. For example, interferometer interrogation beams are two-photon stimulated Raman transitions that are tuned to coherently split into a superposition of states and then recombine the atomic wave packets.

Probe A 312 and probe B 328 are detection beams that measure the number of atoms exiting the interferometer in a particular quantum state. At the output of the interferometer one can monitor the atomic population in either the F=3 or F=4 atomic states, in the case of atomic cesium, by using a laser probe beam (e.g., probe A 312 or probe B 328) disposed at an angle θ with respect to the atomic beam from atom source A 302 and atom source B 318. An angle θ is introduced between the detection probe beam 312 and probe B 328 and atomic beam from source A 302 and atom source B 318 to provide velocity selectivity in the detected atom signal via the Doppler shift associated with the detection beam wave-vector and the atomic velocity. This reduces the spread in atomic velocities which are effectively detected such that contrast is maintained across larger accelerations, and also restricts the speed-angle phase space of the detected atoms. Laser probe A 312 and probe B 328 can be tuned to the F=4, $m_F$=0 resonance to induce fluorescence proportional to the number of atoms in the F=4 state which can then be measured using a photodiode (e.g. collected by lens 314 and measured using $PD_1$ 316 or collected by lens 330 and measured using $PD_2$ 332). The photodiode current is converted to a voltage that can be digitized so that signal processing and filtering techniques can be applied to remove unwanted noise from the signal. Since the atoms entering the interferometer have been pumped into the F=3, $m_F$=0 sublevel, the F=4, $m_F$=0 sublevel has nearly zero background and is therefore ideal for interference fringe detection. The number of atoms in the F=4 state at the output of the interferometer can be expressed as $N_4$=N/2(1−cos(Φ)) where N is the total number of atoms entering the interferometer after being optical pumped into the N=3, $m_F$=0 state. The phase Φ contains the laser phases and inertial sensitivity phase. In some embodiments, additional interactions are applied to increase the momentum transferred to the atoms and increase the interferometer sensitivity due to larger enclosed area. Output signals from photodiodes $PD_1$ 316 and $PD_2$ 332 measure the population of atoms in one or both atomic ground states using a probe laser beam via fluorescence or absorption. The number of atoms in either state is proportional to the fluoresced or absorbed power and the population in either or both states can be measured with one or more laser beams and one or more photodiodes. In various embodiments, the readout from atomic interferometer 300 uses the D2 atomic transition for cesium, uses the D2 atomic transition for rubidium, or any other appropriate atomic transition. Atomic interferometer 300 outputs a pair of photodetector signals ($PD_1$, $PD_2$) containing information about the atomic states of the atoms in the interferometer undergoing various inertial conditions. Note that the acceleration sense axis is parallel to the Raman laser beams and that the rotation sense axis is out of the page for FIG. 3. Note that the position of photodiodes does not have to be as shown in FIG. 3, but instead needs only to be appropriate for collecting florescence or absorption.

Figure 4:
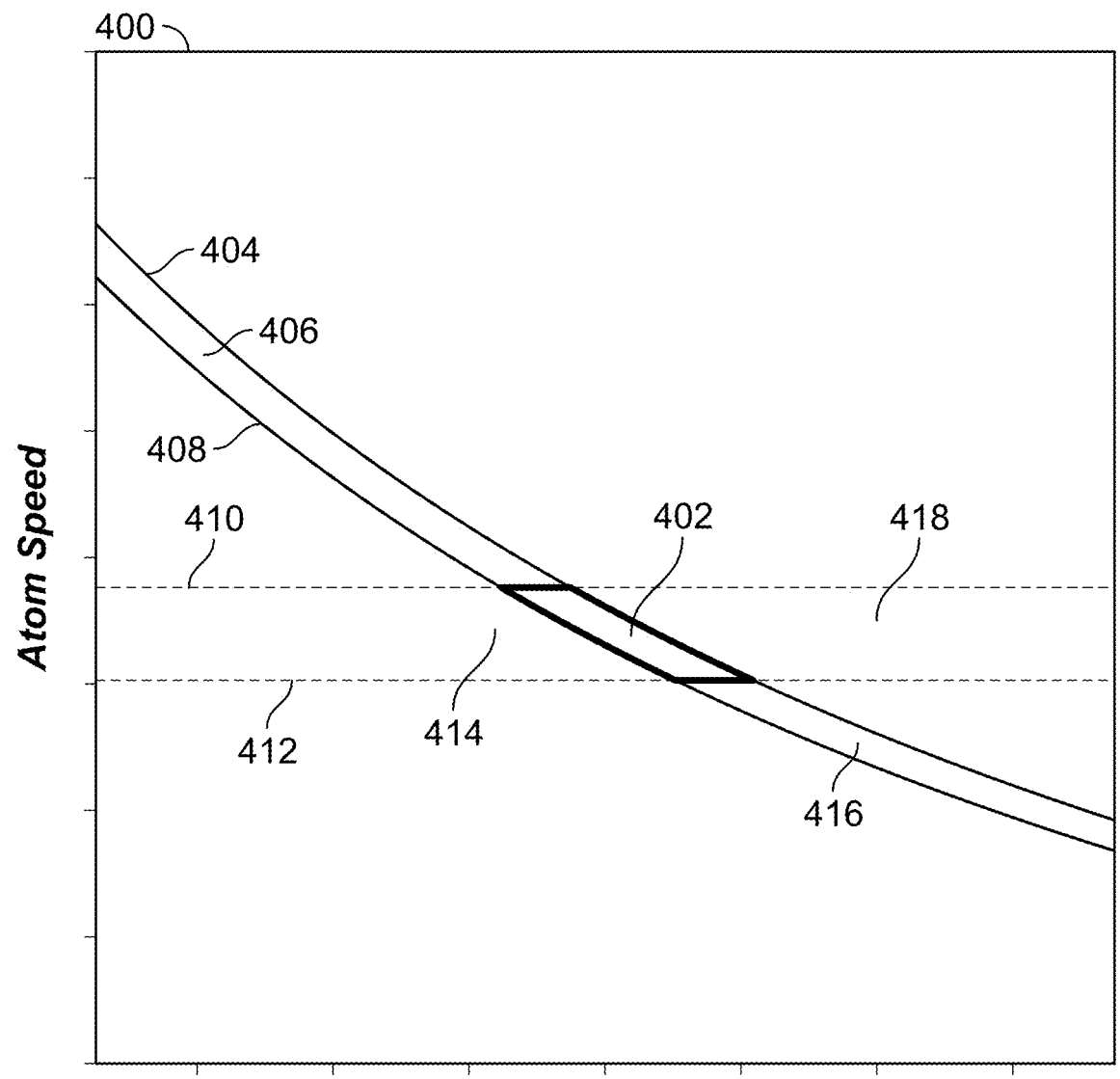
FIG. 4 depicts an embodiment of a phase space in which all possible speeds and angles (in the plane of the Raman beams) of atoms comprising an atomic beam in a thermal beam inertial sensor are represented.

FIG. 4 depicts an embodiment of a phase space in which all possible speeds and angles (in the plane of the Raman beams) of atoms comprising an atomic beam in a thermal beam inertial sensor are represented. In the example shown 400, regions in the (atom-velocity, atom-beam-angle) phase space are demarked which 1) participate in the interferometer, 2) are detected at the output of the interferometer, and 3) do both and therefore contribute to the final detected interferometer signal.

The region between curve 404 and curve 408 are areas that have high probability of having resonance interactions with the Raman beams for a particular power and geometry. The region between curve 410 and curve 412 are areas that have high probability of having resonance interactions with the detection beam for a particular power and geometry.

Region 406, region 402, and region 416 demark atoms with the particular speeds and angles that participate in the interferometer. Region 414, region 402, and region 418 demark atoms with the particular speeds and angles that are detected at the output of the interferometer. In order for a given atom to participate in the final detected interferometer signal, it has to 1) start out in the correct atomic state, 2) interact with the Raman beams, and 3) be resonant with the detection beam. Intersecting region 402 demarks atoms that both interact with the Raman beams and are resonant with the detection beam and therefore contribute to the final detected interferometer signal.

The phase-space filtering in thermal beam inertial sensors provides the ability of the device to be less sensitive to changes in atom speed and atom beam angle. For example, the sensitivity of the mean of the speed of atoms that contribute to the detected interferometer signal to the mean speed of atoms coming out of the nozzle improves by ~50× in the presence of the tilted detection beam compared to a normal detection beam (which detects all atoms). As a result, velocity-sensitive scale factor and bias drifts are similarly reduced by up to 50× due to the phase-space filtering by the combination of the Raman and tilted detection beams.

While this example uses tilted Raman beams, the particular combination of angles for all the beams (state preparation, Raman, and detection beams) has an influence on device performance and can be tuned to achieve immunity to signal drifts and improved device sensitivity. For example, the detunings for Raman and detection beams can be set so that the overlap region 402 corresponds to the phase space peak of the atomic distribution.

In some embodiments, phase-space filtering can be achieved by any physical mechanism which serves to constrain the longitudinal or transverse velocities of the atomic source. Such mechanisms may include time-of-flight filtering resulting from the combination of pulsed state preparation, Raman excitation and detection, velocity selective state-preparation/optical pumping (realized with tilted state-preparation beams), or other atomic velocity manipulation methods (such as laser cooling).

In some embodiments, a laser beam of the set of atom interference lasers or of the one or more additional sets of laser beams achieves the first speed selectivity, the second speed selectivity, the first angle selectivity, and/or the second angle selectivity via a combination of angle with respect to the atomic beam and frequency detuning with respect to the atomic transition of the laser beam. In some embodiments, the first speed and first angle selectivity are given by region 406, region 402, and region 416. In some embodiments, the second speed and second angle selectivity are given by region 414, region 402, and region 418.

In some embodiments, the first speed selectivity or the second speed selectivity produced by the laser beam comprises transverse velocity selectivity. In some embodiments, the first speed selectivity or the second speed selectivity produced by the laser beam comprises longitudinal velocity selectivity. In some embodiments, the longitudinal velocity selectivity is achieved using a time-of-flight selection by pulsing of a state preparation laser beam, a laser beam of the set of atom interference lasers, and/or a detection laser.

Figure 5:
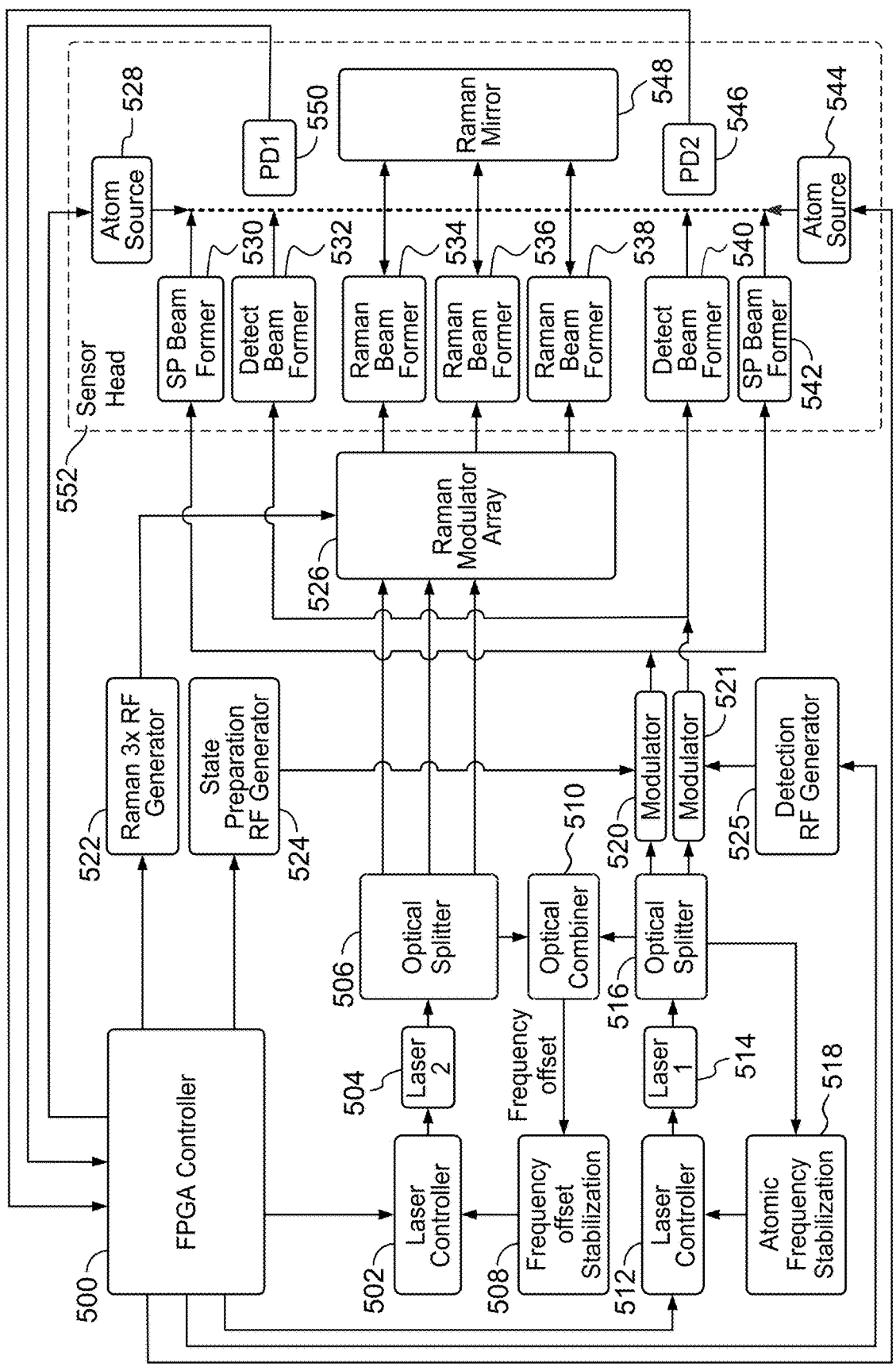
FIG. 5 is a system diagram illustrating an embodiment of phase-space filtering in a thermal beam inertial sensor.

FIG. 5 is a system diagram illustrating an embodiment of phase-space filtering in a thermal beam inertial sensor. In some embodiments, the thermal beam inertial sensor comprises an atom interferometer device. In some embodiments, sensor head 552 of FIG. 5 is used to implement atomic interferometer 100 of FIG. 1. In the example shown, the system for phase-space filtering in a thermal beam inertial sensor uses FPGA controller 500 or any other suitable processor to control external circuit boards, atom source temperatures, atom photodiode readers, and calculate atom phases, rotation rates, and accelerations. Laser controller 502 controls temperature and current of laser of laser 2 504 and can be programmed through FPGA controller 500. Laser controller 512 controls temperature and current of laser of laser 1 514 and can be programmed through FPGA controller 500. Laser 1 514 is locked to an atomic transition, which in the case of cesium may be the F=4→F'=5 cesium D2 transition. Laser 2 504 is locked to laser 1 with an appropriate frequency offset. Optical splitter 516 and optical splitter 506 are a collection of fiber optics or planar light wave circuits that split and direct laser outputs. Atomic frequency offset stabilization 518 is a vapor cell-based spectrometer that provides an atomic reference and generates and error signal so that laser 1 is locked to desired atomic transition. Optical combiner 510 combines samples of laser light from laser 1 514 and laser 2 504 to generate beat note to provide a frequency offset measurement. Frequency offset stabilization 508 is a circuit that detects frequency offset and provides an error signal to laser 2 504 so that laser 2 504 can be stabilized with respect to laser 1 514. Modulator 520 is a lithium niobate waveguide modulator used to generate laser frequencies that cause optical pumping in state preparation process. Raman modulator array 526 is a lithium niobate waveguide modulator array used to generate frequency shifted sidebands on laser beams to create Raman transitions. State preparation (SP) beam former 530 and state preparation (SP) beam former 542 are an optical assembly that generates a state preparation laser beam at an angle $\sphericalangle \lambda$ to the atomic beam. In some embodiments, angle $\sphericalangle \lambda$ is angle $\sphericalangle \lambda$ of FIG. 1. Detect beam former 532 and detect beam former 540 are an optical assembly that generates a detection laser beam where the detection beam is at an angle $\sphericalangle \theta$ with respect to the atomic beam. In some embodiments, angle $\sphericalangle \theta$ is angle $\sphericalangle \theta$ of FIG. 1. Raman beam former 534, Raman beam former 536, and Raman beam former 538 are an optical assembly that generates a Raman laser beam at an angle $\sphericalangle \phi$ with respect to the atomic beam. In some embodiments, angle $\sphericalangle \phi$ is angle $\sphericalangle \phi$ of FIG. 1. Raman mirror 548 is one or more retro-reflecting mirrors to retro-reflect the one or more Raman beams formed by Raman beam former 534, Raman beam former 536, and Raman beam former 538. Atom source 528 and atom source 544 generate beam of atoms. Photodiode (PD1) 550 and photodiode (PD2) 546 are each photodiode assemblies that receive atom fluorescence. Raman RF Generator 522 is a circuit board that generates RF signals to modulate the three Raman lasers generated using optical splitter 506 to produce Raman transitions of the atomic beams. State Prep RF Generator 524 is a circuit board that generates RF signals to prepare the quantum state of the atoms in the two atomic beams. In some embodiments, the atom interferometer device for inertial sensing comprises one or more thermal atomic sources, a state preparation laser, a set of atom interference lasers, and a detection laser. The one or more thermal atomic sources provide one or more atomic beams. A set of atom interference lasers is disposed to provide interrogation laser beams that interrogate the one or more atomic beams to assist in generating atom interference, where the interrogation laser beams are configured so as to enable a first speed selectivity and/or a first angle selectivity of a set of atoms used in the generating of the atom interference by restricting the set of atoms that are involved in the atom interference to a first speed-angle phase space associated with the set of atoms.

Figure 6:
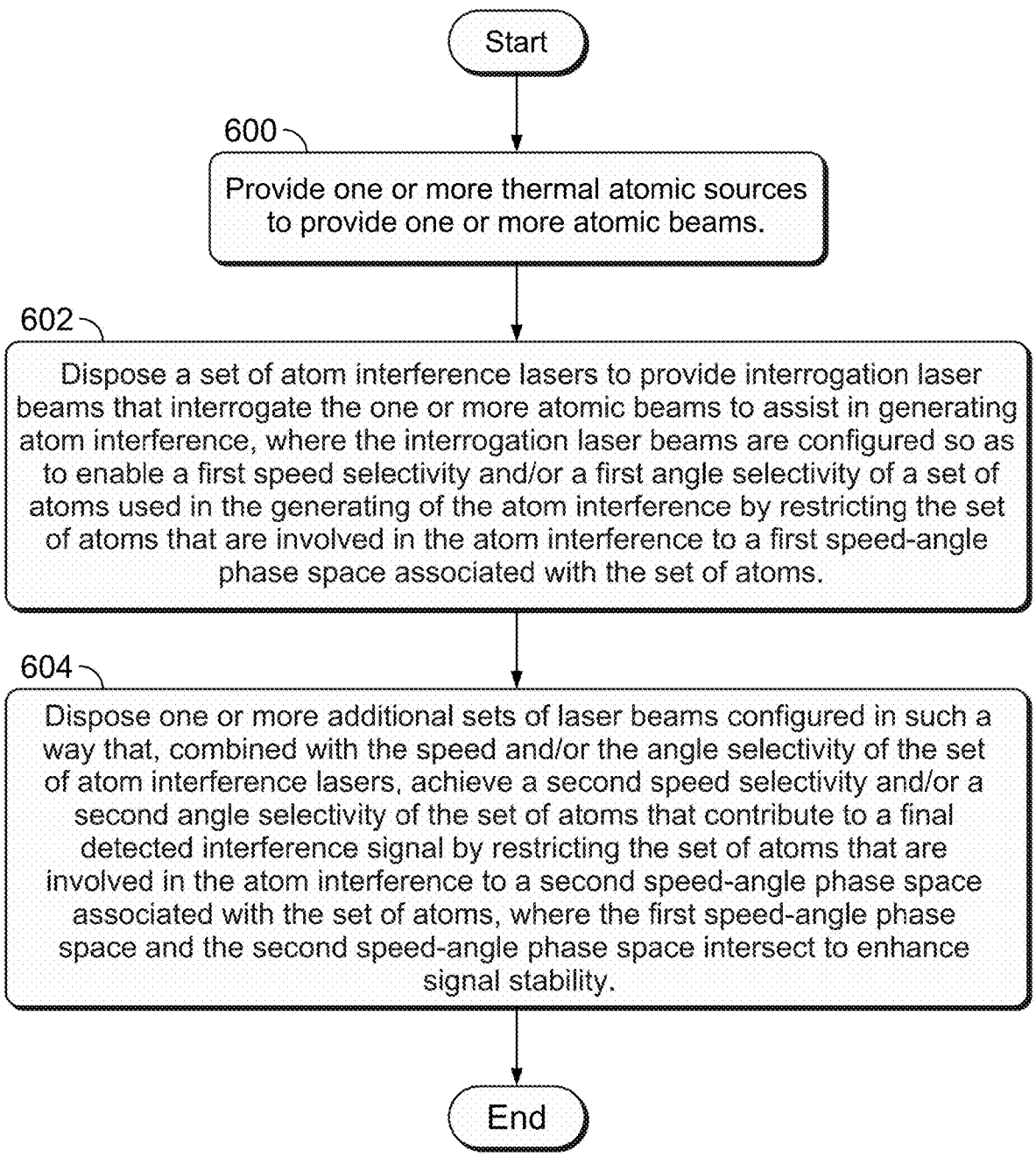
FIG. 6 is a flow diagram illustrating an embodiment of phase-space filtering in a thermal beam inertial sensor.

FIG. 6 is a flow diagram illustrating an embodiment of phase-space filtering in a thermal beam inertial sensor. In the example shown in 600, one or more thermal atomic sources are provided to provide one or more atomic beams. For example, an atomic source generates an atomic beam using an oven. In some embodiments, atomic source is a thermal beam from an effusive oven. The atomic source can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form the atomic beam.

In 602, a set of atom interference lasers is disposed to provide interrogation laser beams that interrogate the one or more atomic beams to assist in generating atom interference. The interrogation laser beams are configured so as to enable a first speed selectivity and/or a first angle selectivity of a set of atoms used in the generating of the atom interference by restricting the set of atoms that are involved in the atom interference to a first speed-angle phase space associated with the set of atoms. For example, a set of Raman lasers is positioned at an angle $\sphericalangle \phi$ with respect to the atomic beam to enable velocity selectivity of atoms such that atomic interferometer interrogation beams comprising two-photon stimulated Raman transitions are tuned to coherently split atoms of an atomic beam into a superposition of states and then recombine the atomic wave packets. In some embodiments, the angle $\sphericalangle \phi$ is angle $\sphericalangle \phi$ of FIG. 1. At the output of the interferometer one can monitor the atomic population in the states that partake in the interferometer—in the case of cesium, in either the F=3 or F=4 atomic states, by using detection beam 114 and detection beam 116 which can be tuned, in the case of cesium, to the F=4 resonance to induce fluorescence proportional to the number of atoms in the F=4 state. The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

In 604, one or more additional sets of laser beams are disposed and configured in such a way that, combined with the speed and/or the angle selectivity of the set of atom interference lasers, achieve a second speed selectivity and/or a second angle selectivity of the set of atoms that contribute to a final detected interference signal by restricting the set of atoms that are involved in the atom interference to a second speed-angle phase space associated with the set of atoms, where the first speed-angle phase space and the second speed-angle phase space intersect to enhance signal stability. For example, a detection laser is positioned to provide a detection laser beam to detect fluorescence scattered by atoms resonant with one or more detection laser beams. In some embodiments, the detection beam is used to detect absorption of atoms resonant with one or more detection laser beams. An angle is introduced between the detection beam and the atomic beam to provide velocity selectivity in the detected atom signal via the Doppler shift associated with the detection beam wave-vector and the atomic velocity. In some embodiments, the angle comprises the angle θ or the angle λ of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   one or more thermal atomic sources to provide one or more atomic beams;
   a set of atom interference lasers disposed to provide interrogation laser beams that interrogate the one or more atomic beams to assist in generating atom interference, wherein the interrogation laser beams are configured so as to enable a first speed selectivity and a first angle selectivity of a set of atoms used in the generating of the atom interference by restricting the set of atoms that are involved in the atom interference to a first speed-angle phase space associated with the set of atoms, wherein an interrogation angle of the interrogation laser beams to the one or more atomic beams is selected; and
   one or more additional sets of laser beams configured in such a way that, combined with the first speed selectivity and the first angle selectivity of the set of atom interference lasers, achieve a second speed selectivity, a second angle selectivity, or the second speed selectivity and the second angle selectivity of the set of atoms that contribute to a final detected interference signal by restricting the set of atoms that are involved in the atom interference to a second speed-angle phase space associated with the set of atoms, wherein an additional laser beam of the one or more additional sets of laser beams used to achieve the second speed selectivity, the second angle selectivity, or the second speed selectivity and the second angle selectivity comprises a detection laser beam, wherein a power is selected for the detection laser beam, wherein the first speed-angle phase space and the second speed-angle phase space and the power selected for the detection beam combine to enhance signal stability.

2. A device of claim 1, wherein an additional laser beam of the one or more additional sets of laser beams used to achieve the second speed selectivity, the second angle selectivity, or the second speed selectivity and the second angle selectivity comprises an adjustable detection laser beam.

3. A device of claim 1, wherein a second additional laser beam of the one or more additional sets of laser beams is used to achieve a third speed selectivity, a third angle selectivity, the third speed and the third angle selectivity of the set of atoms that contribute to a final detected interference signal by restricting the set of atoms that are involved in the atom interference to a third speed-angle phase space associated with the set of atoms, wherein the third speed-angle phase space, the first speed-angle phase space, and the second speed-angle phase space intersect to enhance signal stability.

4. A device of claim 1, wherein an additional laser beam of the one or more additional sets of laser beams used to achieve the second speed selectivity, the second angle selectivity, the second speed selectivity and the second angle selectivity comprises a state preparation laser beam used to prepare atoms in a desired initial state.

5. A device of claim 4, wherein an angle of the state preparation beam to the one or more atomic beams for the second angle selectivity is selected to optimize for number of atoms in an initial state.

6. A device of claim 5, wherein the angle is approximately a right angle.

7. A device of claim 1, wherein a laser beam of the set of atom interference lasers or of the one or more additional sets of laser beams achieves the first speed selectivity, the second speed selectivity, the first angle selectivity, the second angle selectivity, or the first speed selectivity and the first angle selectivity, or the second speed selectivity, and the second angle selectivity via a combination of the interrogation angle with respect to the atomic beam and frequency detuning with respect to the atomic transition of the laser beam.

8. A device of claim 7, wherein the first speed selectivity or the second speed selectivity produced by the laser beam comprises transverse velocity selectivity.

9. A device of claim 7, wherein first speed selectivity or the second speed selectivity produced by the laser beam comprises longitudinal velocity selectivity.

10. A device of claim 9, wherein the longitudinal velocity selectivity is achieved using a time of flight selection by pulsing of a state preparation laser beam, a laser beam of the set of atom interference lasers, a detection laser, the state preparation laser beam and the laser beam of the set of atom interference lasers, the state preparation laser beam and the detection laser beam, the laser beam of the set of atom interference lasers and the detection laser, or the state preparation laser beam and the laser beam of the set of atom interference lasers and the detection laser.

11. A device of claim 1, wherein one of the one or more atomic beams is collimated using an aperture.

12. A device of claim 1, further comprising a cooling stage, wherein the cooling stage cools one of the one or more atomic beams using laser cooling.

13. A device of claim 12, wherein the laser cooling is transverse to a beam direction of one of the one or more atomic beams.

14. A device of claim 12, wherein the laser cooling is longitudinal to a beam direction of one of the one or more atomic beams.

15. A device of claim 1, wherein the interrogation angle of an interrogation laser beam of the interrogation laser beams to the one or more atomic beams is selected to break degeneracy using a Doppler shift by tilting.

16. A device of claim 15 wherein the angle comprises one of the following: 90 degrees plus 2.5, 2.0, 1.5, 1.0, 0.5, or minus 0.5, 1.0, 1.5, 2.0, or 2.5 degrees.

17. A device of claim 1, wherein the one or more atomic beams comprise two atomic beams, and wherein the two atomic beams cross at an angle less than or equal to five degrees.

18. A device of claim 17, wherein the interrogation laser beams are in the plane of the two atomic beams.

19. A device of claim 18, wherein the interrogation laser beams cross each of the two atomic beams at symmetric angles.

20. A device of claim 1, wherein a pulse time width or a pulse beam width interacting with the one or more atomic beams are selected to determine the second speed selectivity.

21. A method, comprising:
    providing one or more thermal atomic sources to provide one or more atomic beams;
    disposing a set of atom interference lasers disposed to provide interrogation laser beams that interrogate the one or more atomic beams to assist in generating atom interference, wherein the interrogation laser beams are configured so as to enable a first speed selectivity and a first angle selectivity of a set of atoms used in the generating of the atom interference by restricting the set of atoms that are involved in the atom interference to a first speed-angle phase space associated with the set of atoms, wherein an interrogation angle of the interrogation laser beams to the one or more atomic beams is selected; and
    disposing one or more additional sets of laser beams configured in such a way that, combined with the first speed selectivity and the first angle selectivity of the set of atom interference lasers, achieve a second speed selectivity, a second angle selectivity, or the second speed selectivity and the second angle selectivity of the set of atoms that contribute to a final detected interference signal by restricting the set of atoms that are involved in the atom interference to a second speed-angle phase space associated with the set of atoms, wherein an additional laser beam of the one or more additional sets of laser beams used to achieve the second speed selectivity the second angle selectivity, or the second speed selectivity and the second angle selectivity comprises a detection laser beam, wherein a power is selected for the detection laser beam, wherein the first speed-angle phase space and the second speed-angle phase space and the power selected for the detection beam combine to enhance signal stability.

* * * * *